(12) United States Patent
Rakshit (10) Patent No.: US 11,010,980 B2
(45) Date of Patent: May 18, 2021

(54) AUGMENTED INTERFACE DISTRACTION REDUCTION

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/582,808

(22) Filed: Sep. 25, 2019

(65) Prior Publication Data

US 2021/0090335 A1 Mar. 25, 2021

(51) Int. Cl.
| | |
|---|---|
| *G06T 19/00* | (2011.01) |
| *G06F 3/01* | (2006.01) |
| *G06F 3/0481* | (2013.01) |
| *G02B 27/00* | (2006.01) |

(52) U.S. Cl.
CPC ........ *G06T 19/006* (2013.01); *G02B 27/0093* (2013.01); *G06F 3/013* (2013.01); *G06F 3/04815* (2013.01)

(58) Field of Classification Search
None
See application file for complete search history.

(56) References Cited

U.S. PATENT DOCUMENTS

| | | | |
|---|---|---|---|
| 9,658,689 B2 | 5/2017 | Bedell, Jr. et al. | |
| 10,109,110 B2 | 10/2018 | Butler et al. | |
| 2016/0379412 A1* | 12/2016 | Butler | G06T 19/006 345/633 |
| 2017/0235931 A1 | 8/2017 | Publicover et al. | |
| 2018/0218538 A1* | 8/2018 | Short | G06T 19/006 |
| 2019/0041644 A1 | 2/2019 | Abele et al. | |

OTHER PUBLICATIONS

"Smart Contact Lenses Market 2018 to 2023 Outlook | Samsung, Sony, Alcon, Google, Sensimed SA, Etc Players Counting $7.2 Bn in Terms of Revenue," MarketWatch, Aug. 14, 2018, 4 pages. https://www.marketwatch.com/press-release/smart-contact-lenses-market-2018-to-2023-outlook-samsung-sony-alcon-google-sensimed-sa-etc-players-counting-72-bn-in-terms-of-revenue-2018-08-14.
Sherr, I., "You've heard of AR glasses, but this startup wants to make them into contact lenses," clnet news, Nov. 14, 2018, 4 pages. https://www.cnet.com/news/youve-heard-of-ar-glasses-but-this-startup-wants-to-make-them-into-contact-lenses/.
Vision Direct, "How Smart contact lenses could totally change your perspective," VisionDirect Blog, Mar. 7, 2019, 6 pages. https://www.visiondirect.co.uk/blog/smart-contact-lenses.
Bhagat, H. R., "Driving Detective switches 'Do Not Disturb' on when you're in a moving vehicle," The Economic Times, Jul. 21, 2018, 3 pages. https://economictimes.indiatimes.com/magazines/panache/driving-detective-switches-do-not-disturb-on-when-youre-in-a-moving-vehicle/articleshow/65083442.cms?from=mdr.
J Z, "Apple's unveils 'do not disturb' mode, augmented reality measuring tool," Discovery Campus, Jun. 4, 2018, 4 pgs. https://www.discoverycampus.com/2018/06/04/apples-unveils-do-not-disturb-mode-augmented-reality-measuring-tool/.

* cited by examiner

*Primary Examiner* — Nicholas R Wilson
(74) *Attorney, Agent, or Firm* — Nolan M. Lawrence (57) ABSTRACT

An audiovisual input from a wearable device is received. It is determined that a discrete task is currently being performed. The determination is based on the receiving the audiovisual input. An unrelated audiovisual input, unrelated to the discrete task is detected. The detection is based on the determining the discrete task. The unrelated audiovisual input is intercepted in response of the detection of the unrelated audiovisual input. The audiovisual input is prevented based on the intercepting the unrelated audiovisual input.

14 Claims, 3 Drawing Sheets

AUGMENTED INTERFACE DISTRACTION REDUCTION

BACKGROUND

The present disclosure relates to augmented interfaces, and more specifically, to improving the usage of augmented reality interfaces to complete discrete transactions.

Augmented interfaces may operate to composite information from a real-world environment with computer-generated information. Augmented interfaces may allow for a user to receive more information concurrently. Augmented interfaces may allow users to perform computing tasks while also interacting with other people. In some cases, it may be difficult to perform computing and also perform other tasks.

SUMMARY

According to embodiments a method, system, and computer program product are disclosed. An audiovisual input from a wearable device is received. It is determined that a discrete task is currently being performed. The determination is based on the receiving the audiovisual input. An unrelated audiovisual input, unrelated to the discrete task is detected. The detection is based on the determining the discrete task. The unrelated audiovisual input is intercepted in response of the detection of the unrelated audiovisual input. The audiovisual input is prevented based on the intercepting the unrelated audiovisual input.

Further, according to embodiments, the wearable device is configured to track a gaze of a user that wears the wearable device. The determination of the discrete task to be perform may be based on the gaze of the user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to augmented interfaces; some particular aspects relate to improving the usage of augmented reality interfaces to complete discrete transactions. While the present disclosure is not necessarily limited to such applications, various aspects of the disclosure may be appreciated through a discussion of various examples using this context.

Augmented reality devices, in some cases, are becoming more popular devices to be used for computing ("augmented reality computing"). Augmented reality computing can involve the use of devices to mix real-world environments with computing environments and audiovisual information. For example, a user may operate a machine while also receiving auditory information from an augmented reality device. In another example, a user may have a conversation with another party while also receiving visual information from an augmented reality device.

Augmented devices used for augmented computing may include wearable speakers and screens, and in some cases, wearable microphones, cameras, and computer processors. Augmented reality computing may include the wearable speakers and screens rendering an augmented reality environment of a real-world environment. Augmented reality computing may have certain benefits. For example, while a user is performing a specific operation on a laptop computer, some extra information may be provided to the user regarding operation of the laptop (e.g., the battery level of the laptop) or regarding the schedule of the user (e.g., upcoming meetings). The user may benefit by being able to remember the upcoming meeting while also performing the specific operation on the laptop computer.

Augmented reality computing may have certain drawbacks, such as inefficiency or reduced real-world acceptance. During use of augmented reality computing, a user may be provided with extra information than is present without the use of augmented reality computing. The extra information may be an issue for the user of the augmented reality computing. For example, a user may receive extra information from an augmented reality device during operation of the augmented reality device. The extra information may be unrelated to operating of a specific machine to perform assembly of heavy components. The user may get distracted by the unrelated information that is received through an augmented reality device. The distraction of the user may cause the user to perform the task more slowly. The distraction of the user may cause a safety hazard to the user or others. In another example, a user may receive extra information from an augmented reality device while in the middle of ordering food from a second person. The extra information may distract the user, and consequently, may cause discomfort to the second person.

A task oriented augmented reality device (TOARD) may operate to improve operation of augmented computing consistent with some embodiments of the disclosure. A TOARD may operate by identifying discrete tasks that are being performed and may responsively alter the augmented environment of the user. A TOARD may be in the form of a wearable device with speakers, screens or some combination (e.g., a headset, augmented glasses, augmented contact lenses). The TOARD may also include wearable microphones, cameras, and computer processors. The TOARD may operate by reducing or eliminating interruptions or unrelated information from the augmented environment of the user.

A TOARD may also improve the operation of eye contact-based computing. Eye contact-based computing can include sharing files, controlling computing system, having social interactions, etc., based on the gaze of a user. During eye content-based computing, a user may have eye contact with another person or gaze at a particular device to execute various actions or be party to various activities. A TOARD may be configured to identify a user is performing eye contact-based computing with another person or device, and accordingly enter a do-not-disturb (DND) mode. In some embodiments, the TOARD may enter the DND mode automatically.

A TOARD may be configured to track the entire duration of eye contact-based computing, and accordingly withdrawing the DND service when eye contact-based computing is over. In some embodiments, a TOARD may be configured to track the gaze of a user with a virtual object, such as in the case of an augmented reality rendered task. For example, a user is interacting with an avatar rendered by wearable contact lenses. The avatar may be of another person. Beneficially, the TOARD may assist a user to interact with the avatar for the entire duration of eye contact-based computing. In some embodiments, a TOARD may ensure that no other objects or persons can distract a user or change the users focus.

In some embodiments, a TOARD can track a user's historical pattern of distraction during eye contact-based computing. For example, a first user utilizing a TOARD may be distracted by certain physical surroundings or digital moving object that are distracting to the user. Responsive to past use by the first user, the TOARD may generate a data structure of information including habits, such as the certain physical surroundings and the distracting moving objects. In future augmented reality computing situations, the TOARD may accordingly using augmented reality alter the augmented environment based on determining a distracting situation or surroundings, and by accessing information stored in the data structure.

Figure 1A:
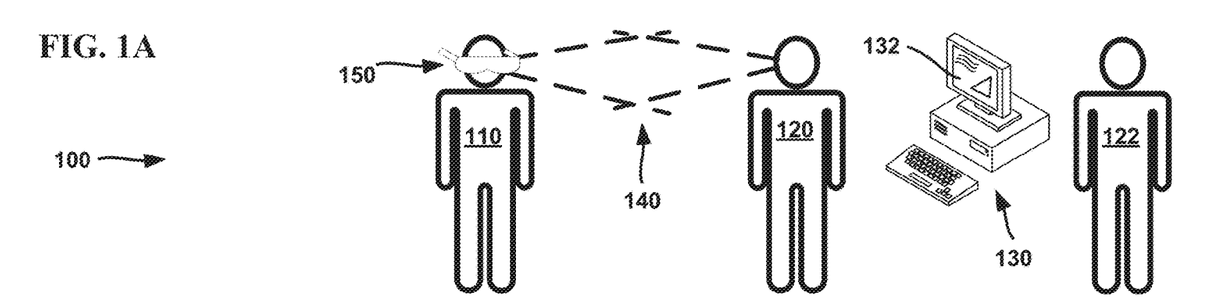
FIG. 1A depicts a real-world environment of task-oriented augmented reality, consistent with some embodiments of the disclosure.

FIG. 1A depicts a real-world environment 100 of task-oriented augmented reality, consistent with some embodiments of the disclosure. The real-world environment 100 may include the following: an augmented user ("user") 110; a second individual 120; a third individual 122; and a non-person object (which may herein be referred to as a "desktop PC" solely for the sake of convenience) 130. The desktop PC 130 may be running one or more computer programs and may be configured to display a graphical user interface ("GUI") 132. The user may utilize a TOARD 150 for engaging in augmented reality computing more efficiently, such as performing tasks more quickly and with more efficiency. The user may also choose to engage in one or more eye-contact based transactions with other elements of the real-world environment 100.

In a first example, the user may decide to read the GUI 132 on the desktop PC 130, and the TOARD 150 may perform alterations to the augmented environment (alternatively, the view) of the user. Tangible benefits may be achieved by this practical application. In detail, the user may operate and navigate through the computer while the TOARD 150 displays information to the user. As the user begins to perform a discrete task on the desktop PC 130, the TOARD may perform image analysis to detect one or more elements and cues that signify the discrete task. Based on determining the discrete task, the TOARD 150 may operate to prevent the user 110 from visualizing the GUI 132 in its entirety. For example, the user 110 uses the desktop PC 130 to perform mathematical calculations in an engineering program on a portion, section, or subsection of the GUI 132. The TOARD 150 may generate an altered augmented view through the TOARD to obscuring or otherwise prevent portions of the view unrelated to the task of the engineering program. Consequently, the user 110 may operate the desktop PC 130 with more efficiency by seeing less menus that are not related to the task.

In another example, the user may be engaged in a conversation 140 with the second individual 120 while in the real-world environment 100. The TOARD 150 may operate to alter the view of the user through the TOARD, such that the user is able to perform interactions more quickly and efficiently. The conversation 140 may be identified based on the view of the users' eyes, such as by scanning the eyes from an optical sensor (not depicted) mounted to the TOARD 150. When eye contact-based computing is in process, then augmented reality system will be enforcing DND mode. Enforced DND mode may include the TOARD 150 blocking or preventing distractions or anything unrelated to the eye contact-based computing. In some embodiments, a user can also configure what types of eye contact-based computing may or may not trigger enforcement of DND mode. For example, user 110 may specify that the TOARD 150 should not block anything related to video screens or monitors within the view of the user. During eye contact-based computing, the TOARD 150 may identify the field of view cone of the user where no other content is to be displayed.

Figure 1B:
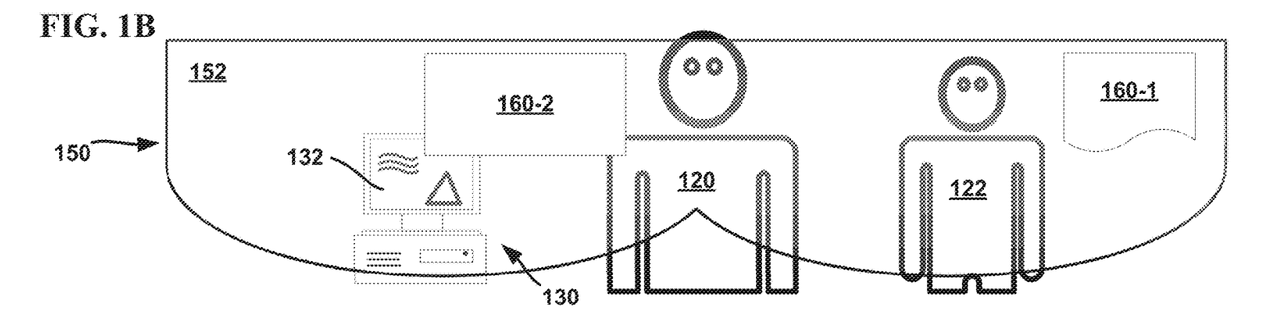
FIG. 1B depicts an augmented reality device with a first augmented environment of the real-world environment, consistent with some embodiments of the disclosure.

FIG. 1B depicts an augmented reality device 150 (augmented device) with a first augmented environment of the real-world environment 100, consistent with some embodiments of the disclosure. The augmented device 150 may be a TOARD capable of determining and discretely focusing on various tasks of the user. The TOARD 150 may include a view boundary 152. The view boundary 152 may be a semi-transparent display and may leverage relevant display technologies (e.g., LCD, OLED). The view boundary 152 may also include the viewpoint of a user (e.g., user 110 in FIG. 1B) that uses the TOARD 150.

The TOARD 150 may also include other elements that are not depicted. For example, the TOARD 150 may include the following: a camera for capturing information of the real-world environment 100; an eye tracker for monitoring and detecting the gaze of the user 110; a network transceiver for communicating with various other devices; a battery for providing electrical power; and a processor for performing tasks such as task-oriented augmented reality. The eye tracker may utilize relevant technology for determining the focus or gaze of a user, such as a retina scanner. The TOARD 150 may also include other not depicted sensors, such as a tilt sensor, light sensor, or gyroscope configured to track the relative position and movement within space of the TOARD 150.

The TOARD 150 may be configured to render an augmented environment through the view boundary 152 that transpires before the conversation 140 begins. The view boundary 152 may permit the user to see various real-world objects including the following: the second individual 120, the third individual 122, and the desktop PC 130. The desktop PC 130 may display (on the GUI 132) information of interest to the user (e.g., a hobby news website). The view boundary 152 may render augmented information elements 160-1 and 160-2 (collectively 160). The augmented information elements 160 may be elements that are not part of the real-world environment 150 but may be from other sources, such as information about operation of the TOARD 150 or information received from other computers (not depicted) that are connected via a network.

Augmented information element 160-1 may be a system status element. The system status element 160-1 may be related to operation of the TOARD 150 and may display various information, such as battery status and the current date and time. Augmented information element 160-2 may be a notification. The notification 160-2 may be rendered by the TOARD 150 in response to receiving a message from a networked computing device (e.g., a picture MMS from a smartphone of the user 110).

Figure 1C:
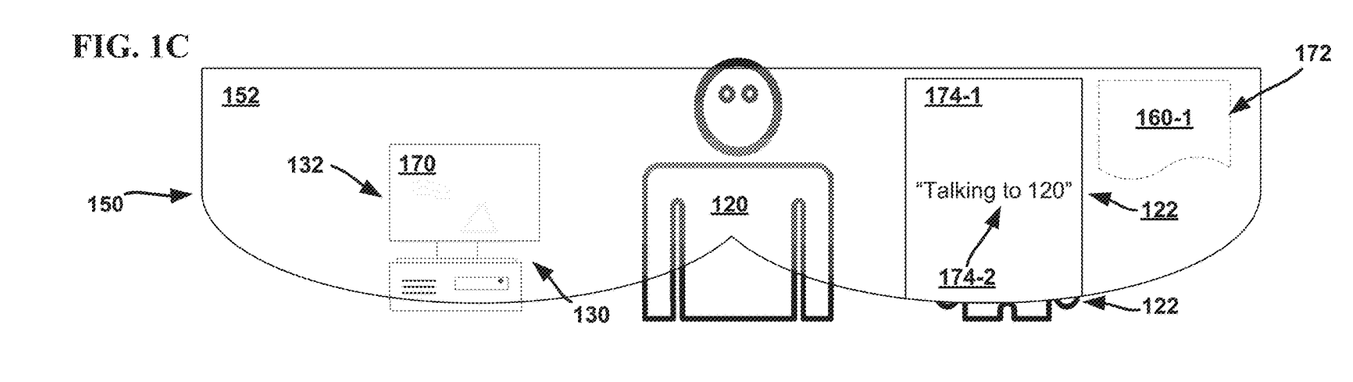
FIG. 1C depicts an augmented reality device with a second augmented environment of the real-world environment, consistent with some embodiments of the disclosure.

FIG. 1C depicts the augmented device 150 with a second augmented environment of the real-world environment 100, consistent with some embodiments of the disclosure. The second augmented environment may be rendered in the view boundary 152 based on determining the conversation 140 has begun. The second augmented environment may be altered in comparison to a base or unaltered augmented environment. The second environment may be altered based on determination of a discrete task being performed (e.g., the conversation 140).

The alterations of the second augmented environment may include intercepting and preventing various portions of both the real-world environment 100 and augmented information elements 160 from distracting the user 110. In a first example, notification 160-2 may be suppressed or otherwise prevented from being rendered at all. In a second example, an altered state 170 may be rendered within a subsection the view boundary 152. The altered state 170 may be a semi-translucent, obscured section, or mostly-opaque element that covers the GUI 132 of the desktop PC 130 or otherwise reduces the visibility of the desktop PC.

In a third example, the system status element 160-1 may be rendered in an altered state 172. The altered state 172 may include the system status element 160-1 rendered with less contrast or opacity. The altered state 172 may include the system status element 160-1 rendered with muted or bland colors. In a fourth example, the third individual 122 may be obscured by altered state elements 174-1 and 174-2 (collectively, altered state 174). Altered state 174 may obscure, blur, pixelized, or otherwise reduce the distraction of the third individual 122. Altered state element 174-1 may be an opaque box augmented within the view boundary 152. Altered state element 174-2 may be computer generated text that communicates that the user is currently in listening to the second individual 120.

FIGS. 1A, 1B, and 1C depict an example of task-oriented augmented reality including identifying objects within an environment and determining tasks and context of a user that wears an augmented reality device, consistent with some embodiments of the disclosure. Some embodiments may leverage an image processor (not depicted). The image processor may be a collection of hardware and software, such as an application specific integrated circuit.

The image processor may be configured to perform various image analysis techniques. The image analysis techniques may be machine learning and/or deep learning based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the image processor may be configured to aid in identifying a face (e.g., by analyzing images of faces using a model built on training data).

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, a real-world object may be analyzed. Using a relevant object detection algorithm, a discrete task may be identified.

In some embodiments, features of the objects may be determined using a supervised machine learning model built using training data. For example, an image may be input into the supervised machine learning model and various classifications detected within the image can be output by the model. For example, characteristics such as object material (e.g., cloth, metal, plastic, etc.), shape, size, color, and other characteristics may be output by the supervised machine learning model. Further, the identification of objects (e.g., a tree, a human face, a dog, etc.) can be output as classifications determined by the supervised machine learning model. For example, if a user snaps an image of their vehicle, a supervised machine learning algorithm may be configured to output an identity of the object (e.g., automobile) as well as various characteristics of their vehicle (e.g., the model, make, color, etc.).

In some embodiments, characteristics of objects may be determined using photogrammetry techniques. For example, shapes and dimensions of objects may be approximated using photogrammetry techniques. As an example, if a user provides an image of a basket, the diameter, depth, thickness, etc. of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object.

Characteristics may include the shapes of objects, dimensions (e.g., height, length, and width) of objects, a number of objects (e.g., two eyes), colors of object, and/or other attributes of objects. In some embodiments, the output may generate a list including the identity and/or characteristics of objects (e.g., cotton shirt, metal glasses, etc.). In some embodiments, the output may include an indication that an identity or characteristic of an object is unknown. The indication may include a request for additional input data that can be analyzed such that the identity and/or characteristics of objects may be ascertained. For example, a source of the object may be prompted to provide features of the face such that objects in their surrounding may be recognized. In some embodiments, various objects, object attributes, and relationships between objects (e.g., hierarchical and direct relations) may be represented within a knowledge graph (KG) structure. Objects may be matched to other objects based on shared characteristics (e.g., skin-tone of a cheek of a person and skin-tone of a chin of a person a GUI that provides information viewable by a user), relationships with other objects (e.g., an eye belongs to a face), or objects belonging to the same class (e.g., two bolt-heads are metric sized).

Figure 2:
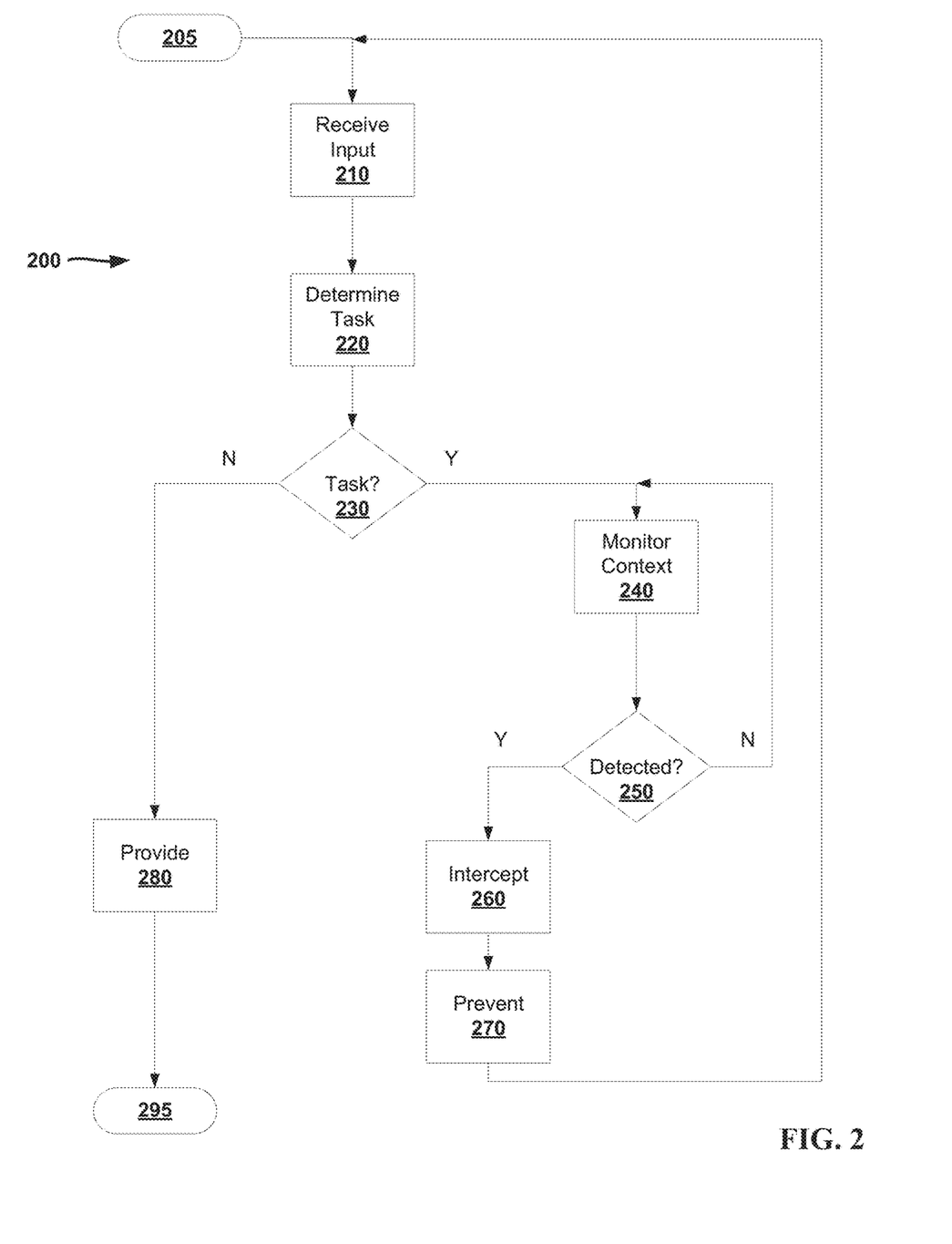
FIG. 2 depicts an example method for performing task-oriented augmented reality, consistent with some embodiments of the disclosure.

FIG. 2 depicts an example method 200 for performing task-oriented augmented reality, consistent with some embodiments of the disclosure. Method 200 may be performed by an augmented reality device. Method 200 may leverage task identification to implement a TOARD consistent with some embodiments. Method 200 may be performed by a processing system such as a computer or computer system (e.g., the computer system 300 depicted in FIG. 3). Method 200 may be performed continuously, at a periodic interval (e.g., every sixteen milliseconds), and/or performed in response to some event.

Method 200 begins at start 205, when audiovisual input is received from a wearable device 210. The wearable device may be configured to provide augmented reality, such as a display configured to be worn within the view of a user. Receiving the input may be based on a sensor such as a microphone or a camera that is aligned with the viewpoint of a user that wears the wearable device. Receiving the input may be based on a network connection of the wearable device. For example, the wearable device may be connected to a network and the receiving the input may be information intended to be displayed by a screen of the wearable device.

A discrete task may be determined to be happening or being performed at 220. The discrete task may be determined based on the receiving the audiovisual input. The audiovisual input may be in the form of auditor signals and visual signals. For example, the discrete task may be a person operating a computer system and the audiovisual input may be the sound of the person typing on a keyboard and an image with the screen centered within the view of the user. Determining a discrete task is being performed at 220 may also include determining that the wearable device should operate in a DND mode. For example, a mode whereby other audiovisual stimuli than what is related to the discrete task should be blocked.

If a discrete task is determined (230: Y), the context of the user may be monitored at 240. The context of the user may include that the user is still performing the discrete task. The context of the user may include the location of the user (e.g., based on location signals received by the wearable device). The context of the user may include any other audible or visual stimulus within the view of the user. In some embodiments, context may be monitored, at 240, based on historical learning. Historical learning may include identifying how the user is or has previously been distracted while performing any augmented reality computing or eye contact-based computing. Monitoring of context may include detecting other audiovisual input (e.g., audible sounds, visual movement) unrelated to the discrete task.

In some embodiments, context may be monitored, at 240, by the wearable device continuously identifying the field of view cone of a user's eyes. For example, a user may use the augmented reality functions of the wearable device to show a virtual avatar of another person or object. The user can also perform eye contact-based computing with the virtual avatar. If the user needs to perform eye contact-based computing with an avatar, the wearable device may identify the compass direction or eye contact direction, and the avatar will be placed in that direction. Simultaneously, the wearable device may continuously identify the primary field of view cone of the user while performing eye contact-based computing with the avatar. The wearable device may monitor the context by visually scanning for other objects within the primary field of view cone of the user other than the avatar. Similar operation may be performed by capturing the gaze of a user. For example, a user may be looking downward off a catwalk to communicate with a coworker, and monitoring context may include monitoring the field of view cone of the user as the user is looking downward.

If there is no audiovisual input that is unrelated to the task detected (250: N), method 200 may continue by monitoring for context at 240. If other audiovisual input that is unrelated to the task is detected (250: Y), then the wearable device may intercept the unrelated audiovisual input at 260. Intercepting the unrelated audiovisual input may include receiving information from an input queue. For example, during monitoring at 240 text messages or phone calls may come in to the wearable device and may enter a queue for processing by the wearable device. Intercepting the unrelated audiovisual input may include receiving information from a frame buffer or other visual rendering engine of the wearable device. For example, the wearable device may be an augmented device with a camera in line to the view of the user. As other objects or information come into view of the camera, this information may be intercepted by method 200.

At 270 the unrelated audiovisual information may be prevented from being provided. Preventing the unrelated audiovisual input may include obscuring a portion of the rendered augmented environment (e.g., the view of the user through the wearable device). Obscuring may include masking, removing from rendering, blocking, or otherwise altering the augmented environment such that the unrelated audiovisual input is not provided to the user. Preventing the unrelated audiovisual input may include partially obscuring a portion of the rendered augmented environment. Partially obscuring may include smearing, blurring, pixelating, desaturating, decoloring, de-contrasting, or otherwise deemphasizing the unrelated audiovisual input in comparison to the rest of the augmented environment. Tracking of the unrelated audiovisual information may be performed repeatedly, for example as a user moves their view to focus on a task or where a distracting element moves around, the obscuring may occur repeatedly and track along with the movement.

After preventing the audiovisual information at 270, method 200 may continue by receiving input at 210 and determining if there is currently a discrete task at 220. If there is no longer a discrete task at 230, any previously prevented audiovisual input that was unrelated to the discrete task ("previously unrelated input") may be provided at 280. Providing previously unrelated input may include re-rendering an augmented environment without obscured portions. Re-rendering may include deblurring, deblocking, re-adding to rendering, or otherwise generating an augmented environment such that the previously unrelated input is visible through the wearable device to a user. Providing previously unrelated input may include reinsert any removed input from an input queue of the wearable device. After providing previously unrelated input, at 280, method 200 ends at 295.

Figure 3:
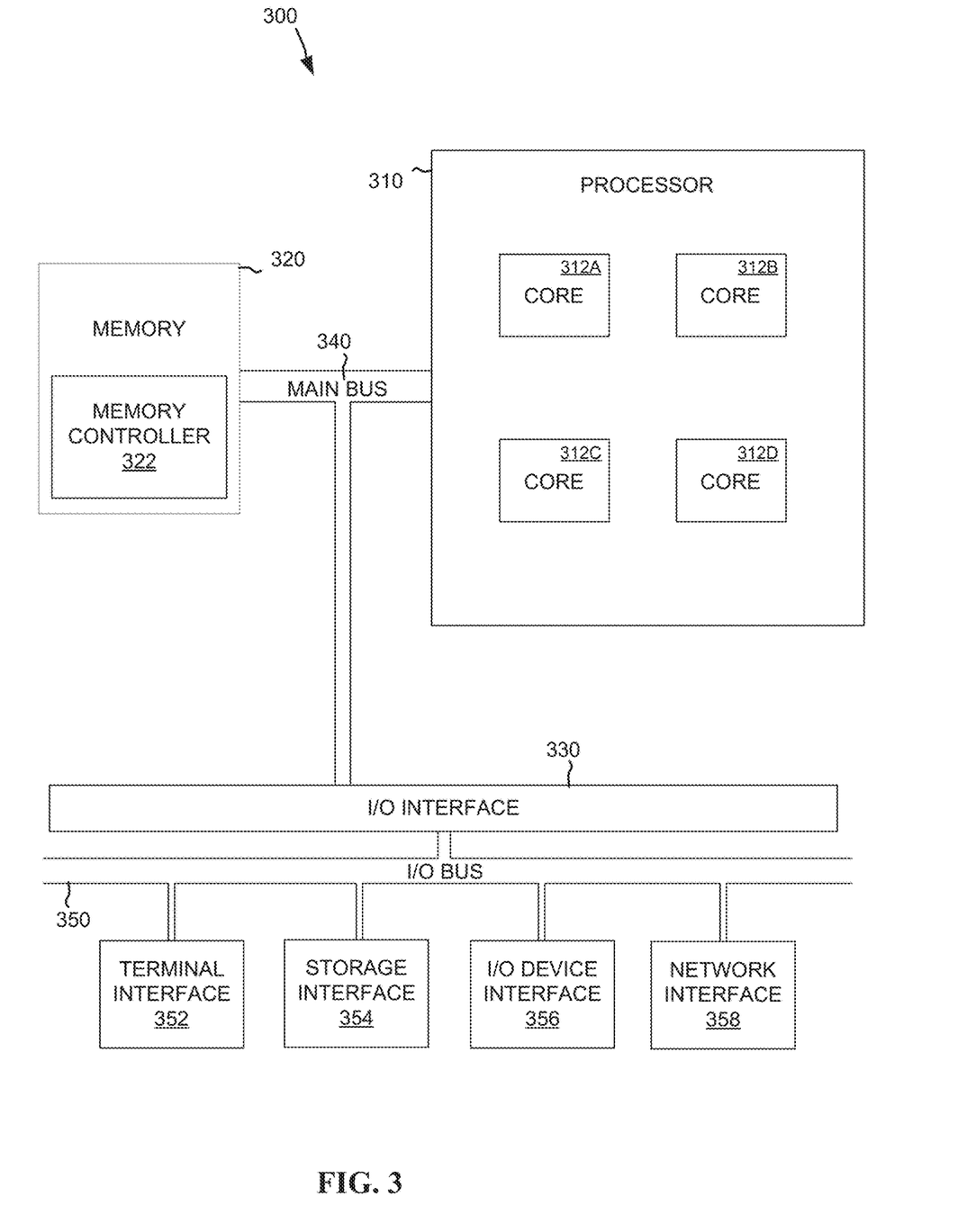
FIG. 3 depicts the representative major components of an example computer system that may be used, in accordance with some embodiments of the disclosure.

FIG. 3 depicts the representative major components of an example computer system 300 (alternatively, computer) that may be used, in accordance with some embodiments of the present disclosure. It is appreciated that individual components may vary in complexity, number, type, and\or configuration. The particular examples disclosed are for example purposes only and are not necessarily the only such variations. The computer system 300 may comprise a processor 310, memory 320, an input/output interface (herein I/O or I/O interface) 330, and a main bus 340. The main bus 340 may provide communication pathways for the other components of the computer system 300. In some embodiments, the main bus 340 may connect to other components such as a specialized digital signal processor (not depicted).

The processor 310 of the computer system 300 may be comprised of one or more cores 312A, 312B, 312C, 312D (collectively 312). The processor 310 may additionally include one or more memory buffers or caches (not depicted) that provide temporary storage of instructions and data for the cores 312. The cores 312 may perform instructions on input provided from the caches or from the memory 320 and output the result to caches or the memory. The cores 312 may be comprised of one or more circuits configured to perform one or more methods consistent with embodiments of the present disclosure. In some embodiments, the computer system 300 may contain multiple processors 310. In some embodiments, the computer system 300 may be a single processor 310 with a singular core 312.

The memory 320 of the computer system 300 may include a memory controller 322. In some embodiments, the memory 320 may comprise a random-access semiconductor memory, storage device, or storage medium (either volatile or non-volatile) for storing data and programs. In some embodiments, the memory may be in the form of modules (e.g., dual in-line memory modules). The memory controller 322 may communicate with the processor 310, facilitating storage and retrieval of information in the memory 320. The memory controller 322 may communicate with the I/O interface 330, facilitating storage and retrieval of input or output in the memory 320.

The I/O interface 330 may comprise an I/O bus 350, a terminal interface 352, a storage interface 354, an I/O device interface 356, and a network interface 358. The I/O interface 330 may connect the main bus 340 to the I/O bus 350. The I/O interface 330 may direct instructions and data from the processor 310 and memory 320 to the various interfaces of the I/O bus 350. The I/O interface 330 may also direct instructions and data from the various interfaces of the I/O bus 350 to the processor 310 and memory 320. The various interfaces may include the terminal interface 352, the storage interface 354, the I/O device interface 356, and the network interface 358. In some embodiments, the various interfaces may include a subset of the aforementioned interfaces (e.g., an embedded computer system in an industrial application may not include the terminal interface 352 and the storage interface 354).

Logic modules throughout the computer system 300— including but not limited to the memory 320, the processor 310, and the I/O interface 330—may communicate failures and changes to one or more components to a hypervisor or operating system (not depicted). The hypervisor or the operating system may allocate the various resources available in the computer system 300 and track the location of data in memory 320 and of processes assigned to various cores 312. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving an audiovisual input from a wearable device;
   determining, based on the receiving the audiovisual input, a discrete task is currently being performed;
   detecting, based on the determining the discrete task, an unrelated audiovisual input, wherein the unrelated audiovisual input is unrelated to the discrete task, wherein the unrelated audiovisual input is from the wearable device, wherein the unrelated audiovisual input is visual;
   intercepting, in response to the detecting the unrelated audiovisual input, the unrelated audiovisual input;
   modifying, based on the intercepting the unrelated audiovisual input, the unrelated audiovisual input, wherein the modifying the unrelated audiovisual input further comprises removing the unrelated audiovisual input from an input queue;
   determining the discrete task is not currently being performed; and
   inserting, in response to the determining the discrete task is not currently being performed by a user, the unrelated audiovisual input into the input queue.

2. The method of claim 1, wherein the unrelated audiovisual input is visual, and wherein the wearable device includes a view boundary, and wherein the unrelated audiovisual input is located within the view boundary of the wearable device.

3. The method of claim 2, wherein the modifying of the unrelated audiovisual input includes altering a subsection of the view boundary corresponding to the unrelated audiovisual input.

4. The method of claim 1, wherein the wearable device is configured to track a gaze of a user that wears the wearable device, and wherein the determining the discrete task is currently being performed is based on the gaze of the user.

5. The method of claim 1, wherein the unrelated audiovisual input is visual, and wherein the wearable device includes a view boundary, and wherein the unrelated audiovisual input is located within the view boundary of the wearable device; and wherein the modifying the unrelated audiovisual input includes:
   generating an obscured section; and
   rendering, within the view boundary of the wearable device, an augmented environment with the obscured section;
   and wherein the method further comprises:
   rendering, within the view boundary of the wearable device and in response to the determining the discrete task is not currently being performed, an augmented environment without the obscured section.

6. The method of claim 1, wherein the unrelated audiovisual input is from the wearable device, and wherein the unrelated audiovisual input is visual, and wherein the unrelated audiovisual input is located within a view boundary of the wearable device,
   and wherein the modifying the unrelated audiovisual input further comprises:
   rendering, within the view boundary of the wearable device, an augmented environment that includes the unrelated audiovisual input with a reduced visibility of the unrelated audiovisual input;
   and wherein the method further comprises:
   rendering, within the view boundary of the wearable device and in response to the determining the discrete task is not currently being performed, an augmented environment that includes the unrelated audiovisual input without the reduced visibility of the unrelated audiovisual input.

7. A system, the system comprising:
   a memory, the memory containing one or more instructions; and
   a processor, the processor communicatively coupled to the memory, the processor, in response to reading the one or more instructions, configured to:

receive an audiovisual input from a wearable device;
determine, based on receiving the audiovisual input, a discrete task is currently being performed;
detect, based on the determine the discrete task, an unrelated audiovisual input, wherein the unrelated audiovisual input is unrelated to the discrete task, wherein the unrelated audiovisual input is from the wearable device, and wherein the unrelated audiovisual input is visual;
intercept, in response to the detect the unrelated audiovisual input, the unrelated audiovisual input;
prevent, based on the intercept the unrelated audiovisual input, the unrelated audiovisual input, wherein the prevent the unrelated audiovisual input further comprises remove the unrelated audiovisual input from an input queue;
determining the discrete task is not currently being performed; and
insert, in response to the determine the discrete task is not currently being performed by a user, the unrelated audiovisual input into the input queue.

8. The system of claim 7, wherein the wearable device is configured to track a gaze of a user that wears the wearable device, and wherein the determine the discrete task is currently being performed, is based on the gaze of the user.

9. The system of claim 7, wherein the unrelated audiovisual input is visual, and wherein the wearable device includes a view boundary, and wherein the unrelated audiovisual input is located within the view boundary of the wearable device,
and wherein the prevent the unrelated audiovisual input includes:
generate an obscured section; and
render, within the view boundary of the wearable device, an augmented environment with the obscured section;
and wherein the processor is further configured to:
render, within the view boundary of the wearable device and in response to the determine the discrete task is not currently being performed, an augmented environment without the obscured section.

10. The system of claim 7, wherein the unrelated audiovisual input is from the wearable device, and wherein the unrelated audiovisual input is visual, and wherein the unrelated audiovisual input is located within a view boundary of the wearable device,
and wherein the prevent the unrelated audiovisual input further comprises:
render, within the view boundary of the wearable device, an augmented environment that includes the unrelated audiovisual input with a reduced visibility of the unrelated audiovisual input;
and wherein the processor is further configured to:
render, within the view boundary of the wearable device and in response to the determine the discrete task is not currently being performed, an augmented environment that includes the unrelated audiovisual input without the reduced visibility of the unrelated audiovisual input.

11. A computer program product, the computer program product comprising a computer readable storage medium having program instructions embodied therewith, the program instructions configured to:
receive an audiovisual input from a wearable device;
determine, based on receiving the audiovisual input, a discrete task is currently being performed;
detect, based on the determine the discrete task, an unrelated audiovisual input, wherein the unrelated audiovisual input is unrelated to the discrete task, wherein the unrelated audiovisual input is from the wearable device, and wherein the unrelated audiovisual input is visual;
intercept, in response to the detect the unrelated audiovisual input, the unrelated audiovisual input;
prevent, based on the intercept the unrelated audiovisual input, the unrelated audiovisual input, wherein the prevent the unrelated audiovisual input further comprises remove the unrelated audiovisual input from an input queue;
determine the discrete task is not currently being performed; and
insert, in response to the determine the discrete task is not currently being performed by a user, the unrelated audiovisual input into the input queue.

12. The computer program product of claim 11, wherein the wearable device is configured to track a gaze of a user that wears the wearable device, and wherein the determine the discrete task is currently being performed, is based on the gaze of the user.

13. The computer program product of claim 11, wherein the unrelated audiovisual input is visual, and wherein the wearable device includes a view boundary, and wherein the unrelated audiovisual input is located within the view boundary of the wearable device, and wherein the prevent the unrelated audiovisual input includes: generate an obscured section; and render, within the view boundary of the wearable device, an augmented environment with the obscured section; and wherein the program instructions further configured to: render, within the view boundary of the wearable device and in response to the determine the discrete task is not currently being performed, an augmented environment without the obscured section.

14. The computer program product of claim 11, wherein the unrelated audiovisual input is from the wearable device, and wherein the unrelated audiovisual input is visual, and wherein the unrelated audiovisual input is located within a view boundary of the wearable device, and wherein the prevent the unrelated audiovisual input further comprises: render, within the view boundary of the wearable device, an augmented environment that includes the unrelated audiovisual input with a reduced visibility of the unrelated audiovisual input; and wherein the program instructions further configured to: render, within the view boundary of the wearable device and in response to the determine the discrete task is not currently being performed, an augmented environment that includes the unrelated audiovisual input without the reduced visibility of the unrelated audiovisual input.

* * * * *